April 26, 1966 B. NARKEN ETAL 3,248,261

PHOTOCONDUCTING LAYERS

Filed Aug. 16, 1962

INVENTORS
BERNT NARKEN
BRIAN SUNNERS
BY George O. Saile
ATTORNEY 3,248,261
PHOTOCONDUCTING LAYERS Bernt Narken and Brian Sunners, Poughkeepsie, N.Y., assignors to International Business Machines Corporation, New York, N.Y., a corporation of New York Filed Aug. 16, 1962, Ser. No. 217,303
4 Claims. (Cl. 117—201)

This invention relates to polycrystalline photoconducting layers, and to a method for preparing photoconductor devices.

Photoconductors have been fabricated from compounds of cadmium and various Group VI–B elements by several methods: as evaporated, powdered, or sintered layers, and as single crystals. In the evaporation procedure, the cadmium compound is evaporated onto a suitable substrate to form the desired photoconductor layer. Photocells may be fabricated according to the powder procedure by using a plastic binder to bind the specially prepared photosensitive cadmium compound powder into a layer. The third procedure for making photoconducting bodies, the sintering method, is effected by adding suitable flux and doping agents to the cadmium compound host material and sintering the mixture at an elevated temperature. Finally, single crystals of photoconductors may be made by a vapor phase reaction of the elements, sublimation of the powder and recrystallization, or growth from the melt.

Higher sensitivity in the photoconductor cells is possible in the single crystal and sintered layer cells than in layers prepared by the evaporated or powder techniques. The single crystal photoconductor fabrication procedures, however, are much more expensive, time-consuming and must be critically controlled to achieve the required characteristics of a photoconductor. Also, the size of the sensitive area is limited by the size of the crystals. The sintered layer procedure yields a photoconductor that has characteristics close to the single crystal photoconductor. However, the sintered layer procedure requires the incorporation of critical amounts of flux and other active impurities to the cadmium compound host material and a carefully controlled sintering procedure. Further, the completed sintered layer photoconductor is highly sensitive to heat and will be degraded thereby.

It is thus an object of this invention to provide an improved photoconductor having high photosensitivities.

It is another object of this invention to provide photoconductor layers having excellent photosensitive properties and which have high light and temperature stability.

It is a further object of this invention to provide a method for fabricating the improved photoconductor layers of the invention.

It is another object of this invention to provide a procedure for fabricating a photoconductive layer and also encapsulating the photoconductive layer in one step.

These and other objects are accomplished in accordance with the broad aspects of the present invention by providing a substantially continuous polycrystalline layer of an intimate mixture of interlocked photoconducting crystals and glass. The photoconducting crystals comprise a substance selected from the group consisting of the sulfides, selenides, tellurides and sulfoselenides of cadmium.

The photoconducting layer of the present invention is produced according to the novel fabrication procedure which includes thoroughly and intimately mixing glass frit and a commercial high purity grade of cadmium compound from the group consisting of the sulfides, selenides, tellurides and sulfoselenides of cadmium; depositing the mixture upon a substrate; and firing the deposited material at a temperature above the softening point of the glass frit used. Upon cooling the deposited mixture to a temperature below that of the softening point of the glass frit, the resultant layer is a substantially continuous polycrystalline layer of an intimate mixture of interlocked photoconducting crystals of the cadmium compound and glass. This layer has excellent photoconducting properties without using the activators commonly used in the conventional sintered cadmium compound photoconductor.

The foregoing and other objects, features and advantages of the invention will be apparent from the following more particular description of the preferred embodiments of the invention, as illustrated in the accompanying drawings.

Figure 1:
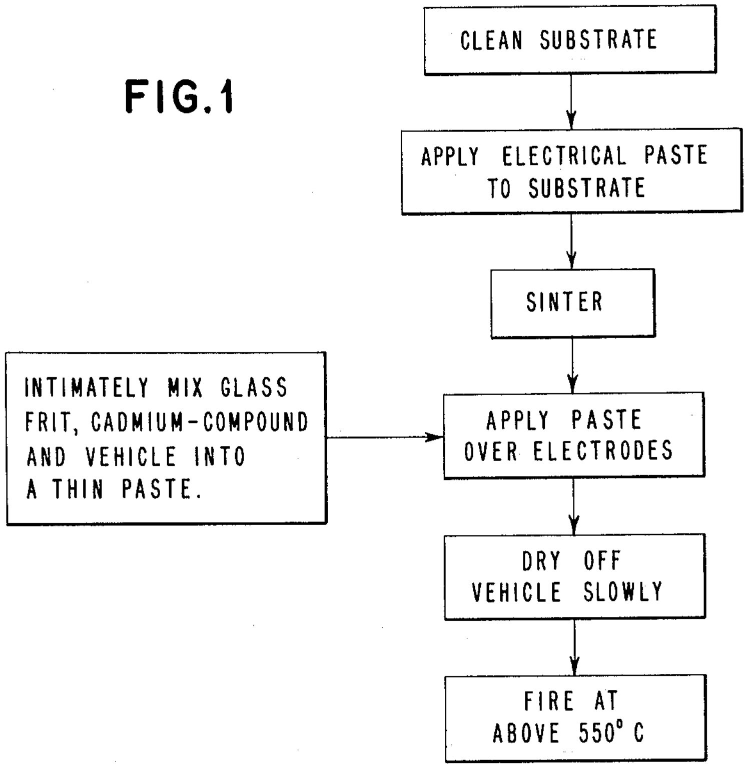
FIGURE 1 is a flow chart illustrating the steps of the novel process.

Referring now, more particularly, to FIGURE 1 a suitable substrate for the application of a polycrystalline photoconductor is thoroughly cleaned. A suitable substrate must have the properties of mechanical strength, high electrical insulation, high thermo-conductivity and good mechanical bonding to the photoconductor material. Substrates which have these properties include a high percentage aluminum oxide ceramic and high purity chemical and thermally resistant glasses. Washing of the substrate may be accomplished by heating the substrate in hot distilled water containing a detergent and agitating the liquid. The substrate is then thoroughly rinsed in hot distilled water and dried.

The electrode connections to the photoconductor layers may be applied either over the photocell by, for example, a painting procedure or by applying the electrodes to the substrate, then covering the electrodes with the photoconductor material and firing the photoconductor material. It is preferred that the electrodes be applied prior to the application of the glass frit and cadmium compound paste. Using this alternative, an appropriate electrode paste, for example, a 35% platinum paste, may be applied by silk screening onto the substrate in the desired geometry. The electrode paste is then fired at a high temperature in a furnace, cooled, rinsed in hot water and dried.

A high purity, finely divided powdered cadmium compound, such as cadmium sulfide, cadmium selenide, cadmium telluride and any mixture of cadmium sulfide or cadmium selenide, together with a glass frit are intermixed. The particle size of both the cadmium compound and the glass frit should be very small and preferably less than 50 microns (which particles will pass in their wet form through a standard 325 mesh screen). The cadmium compound and glass frit mixture are then made into a thin paste or slurry using a low viscosity vehicle, such as pine oil or oil of rosemary. The slurry must be stirred or mixed very well for best results. A thorough and intimate mixture in the vehicle is very important to produce optimum photoconductivity. The slurry or thin paste of the cadmium compound and glass frit in the vehicle is then applied to the substrate in the desired geometry by any conventional application procedure, such as spraying, doctor blading or silk screening.

The vehicle from the applied layer may be dried off slowly, such as by placing the substrate on a hot plate. The substrate is then placed in a furnace and fired at a temperature above approximately 550° C. depending upon the particular cadmium compound and the particular glass used. The time of firing is not highly critical, but if the material is fired for too long a period at a very high temperature such as 750° C., some photoconductor sensitivity is lost. Firing times can be from fifteen seconds to ten minutes depending largely upon the thickness of the photoconducting layer deposited. Following the firing period, the layer may be cooled by any convenient procedure to a temperature below the softening point of the glass frit. The resultant photoconducting layer is a substantially crystalline layer of an intimate mixture of interlocked photoconducting crystals of the cadmium compound and glass.

The percentage of the cadmium compound to the glass may be varied in the mixture. The more cadmium compound in the mixture percentage-wise the more photoconductivity will be obtained in the final layer. As the percentage of the cadmium compound in the mixture is increased much above 50%, the problem of the sublimation of the cadmium compound is increased and the resulting photoconductive layer is reduced thereby in the percentage of the cadmium compound. At percentages between 10 and approximately 50%, the glass protects the cadmium compound very effectively from subliming even where the firing temperatures are as high as 700 to 850° C.

Effective glass encapsulation of the photoconducting interlocked polycrystalline cadmium compound is readily obtainable when using lower percentages of cadmium compound. The cadmium compound particles of the lower concentrations of the cadmium compound will tend to settle to the bottom of the mixture on the substrate and the glass, which is an insulator, remains on top as the encapsulent. It is, therefore, possible in one step to cause the applied layer to become photoconducting and encapsulate the photoconductor in a glass insulator.

Photoconductor layers of the present invention are highly stable under extreme temperature conditions. Photoconductors produced according to the invention were subjected to temperatures of 550° C. for 12 hours and experienced no change in their photoconductivity. Ordinarily, photoconductors of the prior art at such temperatures would have disintegrated within minutes.

It has been found through tests that borosilicate glasses of widely varying compositions may be used as the glass portion of the mixture. Where a high percentage lead borosilicate glass is used, however, lead will reduce out of the glass at high firing temperatures and cause conduction in the layer. This condition with the high percentage lead glass behaves like a parallel path or a short to the photoconductor and lowers the dark resistance of the photoconductor. The amount of reduction of the lead increases with temperature but is detected only at temperatures above 500 to 600° C. (depending on the lead content). A limit exists on the amount of lead in the glass formulation for a given system, since a minimum temperature of approximately 550° C. is necessary to produce photoeffects in the cadmium compound host material. The temperature must be high enough to produce photoconduction but below the temperature where lead reduces out and causes shorting.

The introduction of electron donors, such as aluminum, gallium and indium, by doping into the cadmium compound produces an improvement of the photoconduction. The undoped cadmium compound itself, however, does produce an excellent photoconducting layer.

Figure 2:
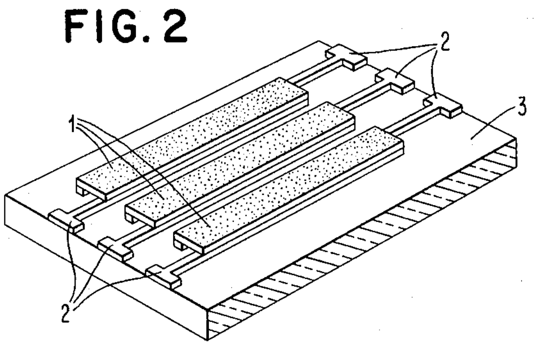
FIGURE 2 is a perspective view of one form that the completed photoconductor device may take.

FIGURE 2 illustrates one form which the photoconductor device might take. Three photoconductor elements or cells in the form of layers 1 are located over conducting lines 2. The conducting lines are deposited in an appropriate geometry over a nonconducting substrate 3. The surface areas of the photoconductive layer not contiguous to the substrate are composed primarily of glass. The glass effectively insulates the substantially crystalline layer of an intimate mixture of interlocked photoconducting crystals of the cadmium compound within the body of each photoconductive layer 1.

The following are examples of the present invention in detail. The examples are included merely to aid in the understanding of the invention, and variations may be made by one skilled in the art without departing from the spirit and scope of this invention.

*Example 1*

High purity, finely divided powdered cadmium selenide and glass frit were intimately dry mixed in a 1 to 1 parts by weight ratio. The particle size of both the cadmium selenide and the glass frit were less than 50 microns. The glass frit was of the following approximate composition by weight:

| | Percent |
|---|---|
| Silicon dioxide ($SiO_2$) | 20 |
| Lead oxide (PbO) | 22 |
| Boron oxide ($B_2O_3$) | 14 |
| Zinc oxide (ZnO) | 32 |
| Cadmium oxide (CdO) | 2.5 |
| Titanium oxide ($TiO_2$) | 4.0 |
| Aluminum oxide ($Al_2O_3$) | 3.0 |
| Other oxides | 2.5 |

Pine oil was added to the mixture in quantity sufficient to make a slurry of thin plaste consistency. The mixture was thoroughly and intimately mixed for 1 hour. The mixture was then deposited by doctor blading over an aluminum oxide ceramic substrate that had on its surface sintered platinum paste electrodes of the type shown in FIGURE 2. The substrate with the layer deposited thereon was placed upon a hot plate and the pine oil was slowly evaporated out of the layer. The substrate with the layer of a cadmium selenide-glass mixture was inserted into a furnace held at 750° C. and fired therein in air for a period of five minutes. The substrate and layer were then rapidly cooled to room temperature within 10 to 15 seconds. The resulting photoconductor layer had a dark resistance in the order of 1000 megohm and light resistance of about 300 kilohm for the approximate 5 square photoconductor. The light source used for the photoconductor test was a 1000 microwatt per square centimeter.

The photoconductor was then placed in a furnace and maintained at a temperature of 550° C. for 12 hours. The photoconductor was then cooled and its photoconductive characteristics were again taken. There was no change from the values obtained before the high temperature aging test.

*Example 2*

High purity, finely divided powdered cadmium sulfide and glass frit were intimately dry mixed in a 3 parts glass to 1 part cadmium sulfide by weight mixture. The particles sizes of both the cadmium sulfide and the glass frit were less than 50 microns. The glass frit approximate composition was that given in the Example 1 above. Pine oil was added to the mixture in quantity sufficient to make a slurry or thin paste. The mixture was then thoroughly and intimately mixed for 1 hour. The mixture was, at this point, deposited by doctor blading over an aluminum oxide ceramic substrate that had on its surface sintered platinum paste electrodes of the type shown in FIGURE 2. The substrate with the layer deposited thereon was placed upon a hot plate and the pine oil was slowly evaporated out of the layer. The substrate having the cadmium sulfide-glass mixture thereon was inserted into a furnace held at 750° C. and fired therein in air for 30 seconds. The substrate and layer were taken from the furnace and rapidly cooled to room temperature within 10 to 15 seconds. The resulting layer had good photoconducting properties.

*Example 3*

Glass frit of each of the following approximate compositions were dry mixed with cadmium selenide in a 3 parts glass to 1 part cadmium selenide by weight ratio:

| | Compositions (in weight percent) | | |
|---|---|---|---|
| | A | B | C |
| Silicon dioxide ($SiO_2$) | 12 | 20 | 28 |
| Lead oxide (PbO) | 59 | 22 | 51 |
| Boron oxide ($B_2O_3$) | 10 | 14 | 18 |
| Zinc Oxide (ZnO) | -------- | 32 | -------- |
| Cadmium oxide (CdO) | -------- | 2.5 | -------- |
| Titanium oxide ($TiO_2$) | -------- | 4.0 | -------- |
| Aluminum oxide ($Al_2O_3$) | -------- | 3.0 | -------- |
| Other oxides (including ZnO in compositions A and C) | 19 | 2.5 | 3 |
| | 100 | 100 | 100 |

The particle sizes of both the cadmium selenide and the glass frit were less than 50 microns. Pine oil was added to make each glass-cadmium selenide dry mixture into a thin paste. Mixing, depositing on the substrate and the slow evaporation of the pine oil vehicle for each paste were accomplished as in the above examples. The compositions by weight of each of the layers and firing conditions therefore are listed below:

| Cadmium Selenide | Glass Frit | Time, min. | Temperature, ° C. |
|---|---|---|---|
| 25% | 75% A | 1 | 700 |
| 25% | 75% A | 1 | 550 |
| 25% | 75% B | 1 | 700 |
| 25% | 75% C | 1 | 700 |

The layers were fired in air as listed above and each cooled rapidly to room temperature after being taken from the furnace. Good photoconducting properties were found in layers 2, 3 and 4. The layer 1 showed photoconductivity but had a low dark resistance of 500 ohms. This shorting effect is attributed to the high percentage lead oxide in the borosilicate glass used and the high firing temperature.

*Example 4*

Mixtures were made of cadmium selenide and glass frit of the B composition listed in Example 3 above wherein the cadmium selenide was predoped with the following impurities:

| | |
|---|---|
| Aluminum Atom p.p.m. cadmium selenide | 126 |
| Gallium | 330 |
| Indium | 540 |

Mixes were made up for each predoped cadmium selenide composition with the composition B glass frit in a 3 parts glass to 1 part cadmium selenide composition by weight ratio. The particle size of the ingredients were again held at less than 50 microns and pine oil was used as the vehicle. Mixing, depositing on the substrate and slow evaporation of the pine oil vehicle for each paste were accomplished as in the above examples. Firing in air for each composition was at 750° C. for 1 minute. Each layer was rapidly cooled to room temperature after firing. The resulting layer in each case of electron donor had good photoconducting properties. The photoconduction in these predoped layers was slightly better than in the layers of -previous examples using undoped cadmium selenide. The aluminum and gallium predoped layers were approximately equivalent photoconductors. The indium predoped layer was slightly superior to that of the aluminum and gallium predoped layers.

The invention thus provides a method of simply producing photoconductors by mixing glass frit and a cadmium compound such as cadmium sulfide, cadmium selenide, cadmium telluride or cadmium sulfoselenide in a suitable vehicle, depositing the mixture on a suitable substrate and firing at an elevated temperature. The resultant product has good photoconducting properties and superior light and temperature aging characteristics. Furthermore, where low cadmium compound percentages in the glass-cadmium compound mixture are used, some of the glass in the mixture forms an encapsulating insulator layer over the photoconductor portion of the layer. The conventional encapsulating of the photoconducting device is thereby made unnecessary.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. The method for producing a photoconducting layer comprising:

coating a substrate with a material including primarily an intimate mixture of glass frit and an unactivated substance in a nonphotoconducting state selected from the group consisting of sulfides, selenides, tellurides and sulfoselenides of cadmium;

said substance present in said material in an amount in the range of 10 to 50 percent;

heating said coating at a temperature above the softening point of said glass frit;

and cooling the coating to room temperature.

2. The method for producing a photoconducting layer comprising:

intimately mixing glass frit and an unactivated substance in a nonphotoconducting state selected from the group consisting of sulfides, selenides, tellurides and sulfoselenides of cadmium;

forming a layer of said mixture of uniform thickness on a substrate;

heating said deposited layer at a temperature above the softening point of said glass frit;

and cooling the layer to a temperature below the melting point of said glass frit, thereby activating said substance to a photoconducting state and producing said photoconducting layer which is a substantially crystalline layer of an intimate mixture of interlocked photoconducting crystals of said substance and said glass.

3. The method for producing a photoconducting layer comprising:

intimately mixing a borosilicate glass frit and an unactivated substance in a nonphotoconducting state selected from the group consisting of sulfides, selenides, tellurides and sulfoselenides of cadmium in a vehicle;

depositing said mixture onto a substrate;

slowly evaporating said vehicle from said deposit;

firing said deposited material at a temperature above 550° C. for at least 15 seconds;

and cooling the said deposited material to a temperature below the softening point of said glass frit, thereby activating said substance to a photoconducting state and producing said photoconducting layer which is a substantially crystalline layer of an intimate mixture of photoconducting crystals of said substance and said glass.

4. A photoconductive device having a substantially continuous polycrystalline layer of an intimate mixture of interlocked photoconducting crystals and glass produced by mixing glass frit and an unactivated substance in a nonphotoconductive state selected from the group consisting of sulfides, selenides, tellurides, and sulfoselenides of cadmium, forming a layer of the resultant mixture on a substrate, firing the layer to a temperature above the softening point of said glass frit, and cooling the layer to a temperature below the melting point of said glass frit, thereby activating said substance to a photoconductive state and producing said polycrystalline layer.

References Cited by the Examiner

UNITED STATES PATENTS

| | | | |
|---|---|---|---|
| 2,698,915 | 1/1955 | Piper | 117—33.5 X |
| 2,765,385 | 10/1956 | Thomsen | 117—201 X |
| 2,824,992 | 2/1958 | Bouchard et al. | |
| 2,857,541 | 10/1958 | Etzel et al. | 252—301.6 X |
| 2,866,117 | 11/1958 | Walker et al. | |
| 2,937,353 | 5/1960 | Wasserman. | |
| 2,955,269 | 10/1960 | Silvey | 338—15 |
| 2,997,408 | 8/1961 | Heureux | 117—201 |
| 2,997,677 | 8/1961 | Lubin | 338—15 |
| 3,010,044 | 11/1961 | Cerulli | 117—33.5 |
| 3,017,296 | 1/1962 | Dunn et al. | 117—201 |
| 3,129,108 | 4/1964 | Katona | 117—215 X |

RICHARD D. NEVIUS, *Primary Examiner.*

RICHARD M. WOOD, A. GOLIAN, H. T. POWELL, *Assistant Examiners.*

Notice of Adverse Decision in Interference

In Interference No. 95,920 involving Patent No. 3,248,261, B. Narken and B. Sunners, PHOTOCONDUCTING LAYERS, final judgment adverse to the patentees was rendered Apr. 20, 1970, as to claims 1, 2, 3 and 4.

[*Official Gazette September 8, 1970.*]